E. D. & J. P. RHOADS.
Trace Fastener.
No. 78,011.
Patented May 19, 1868.
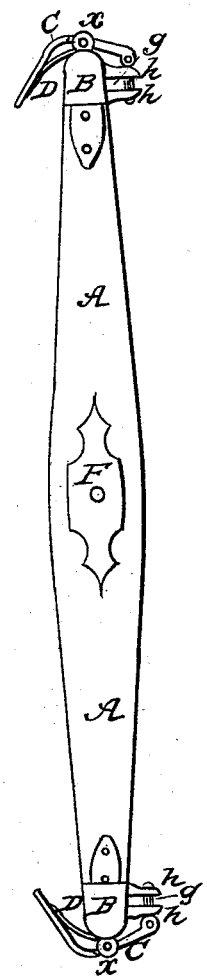
WITNESSES
INVENTORS

United States Patent Office.

E. D. RHOADS AND J. P. RHOADS, OF DAYTON, INDIANA.

*Letters Patent No. 78,011, dated May 19, 1868.*

TRACE-FASTENER.

*The Schedule referred to in these Letters Patent and making part of the same.*

TO ALL WHOM IT MAY CONCERN:

Be it known that we, E. D. RHOADS and J. P. RHOADS, of Dayton, in the county of Tippecanoe, and in the State of Indiana, have invented certain new and useful Improvements in Trace-Fasteners; and do hereby declare that the following is a full, clear, and exact description thereof, reference being had to the accompanying drawings, and the letters of reference marked thereon. In the annexed drawings, making a part of this specification—

A represents an ordinary swingle-tree, made of any suitable dimensions, and B represents the ferrule secured over the end thereof. The ferrule B has jaws or flanges, $h\ h$, projecting forward therefrom, between which the harness-tug is caught, and thereby attached to the swingle-tree.

C represents a bent or curved lever, pivoted to the end of the ferrule B at $x$, as shown, and has a small sliding pin, $g$, pivoted to its forward end. The pin $g$ works in holes in the jaws $h\ h$, and is operated by the lever C, to which it is pivoted.

D represents a spring, secured to the back or outer end of the lever C; one end resting against the ferrule, and holds the lever C, and thereby the pin $g$, firmly and closely in place.

Having thus fully described our invention, what we claim as new, and desire to secure by Letters Patent, is—

The arrangement of the ferrule B, with its perforated jaws $h\ h$, and the lever C, with its spring D and pivoted pin $g$, said lever being pivoted to the outer end of the ferrule, and curved to the rear of the swingle-tree, to operate substantially as set forth.

In testimony that we claim the foregoing, we have hereunto set our hands, this 15th day of February, 1868.

E. D. RHOADS,
J. P. RHOADS.

Witnesses:
JOHN H. BUCKLES,
ROBT P. DAVIDSON.